Oct. 13, 1970     L. H. LANGE     3,533,216
MECHANISM FOR FEEDING AND APPLYING CIRCULAR CAPS TO CONTAINERS
Filed Sept. 26, 1968     8 Sheets-Sheet 1
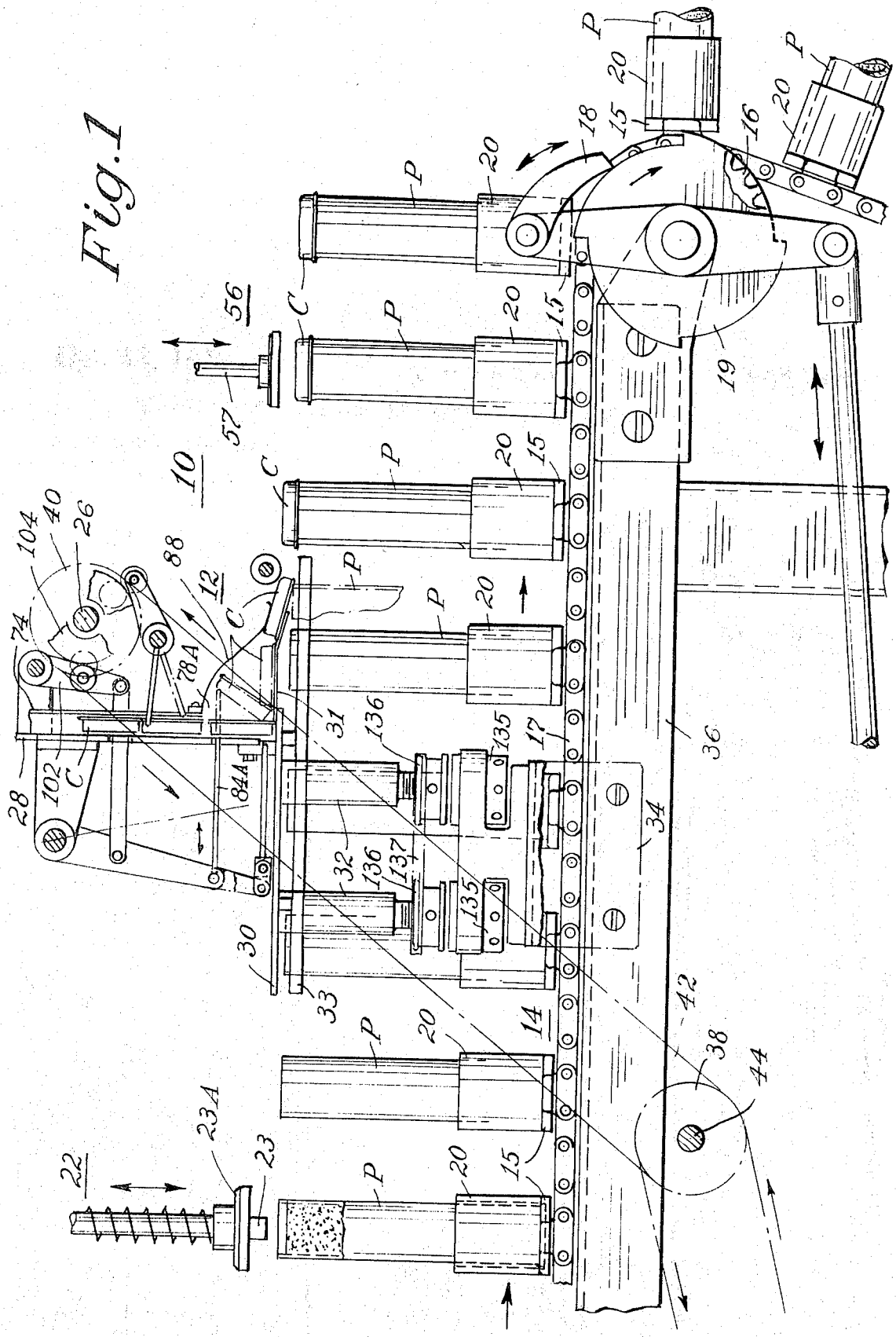

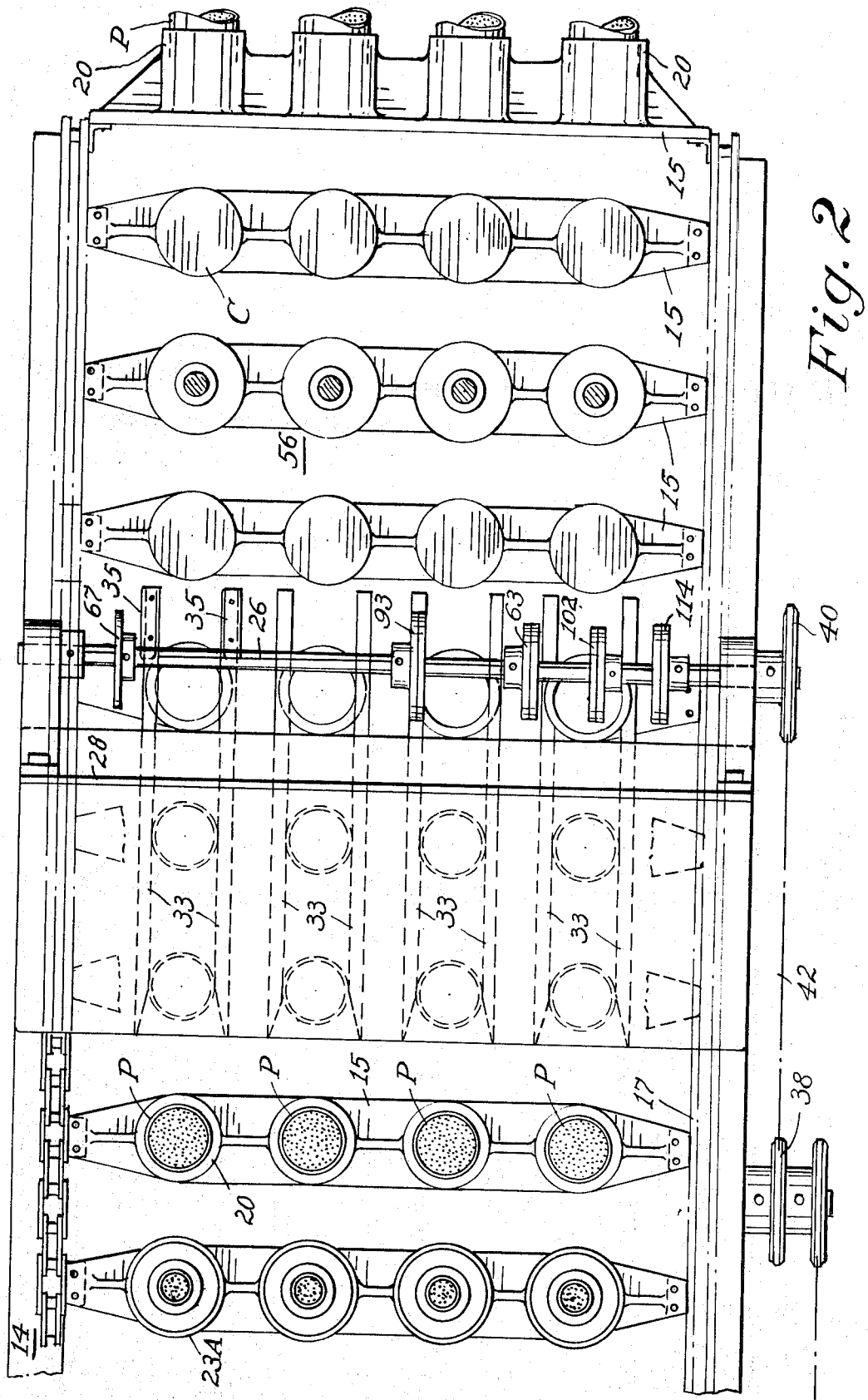

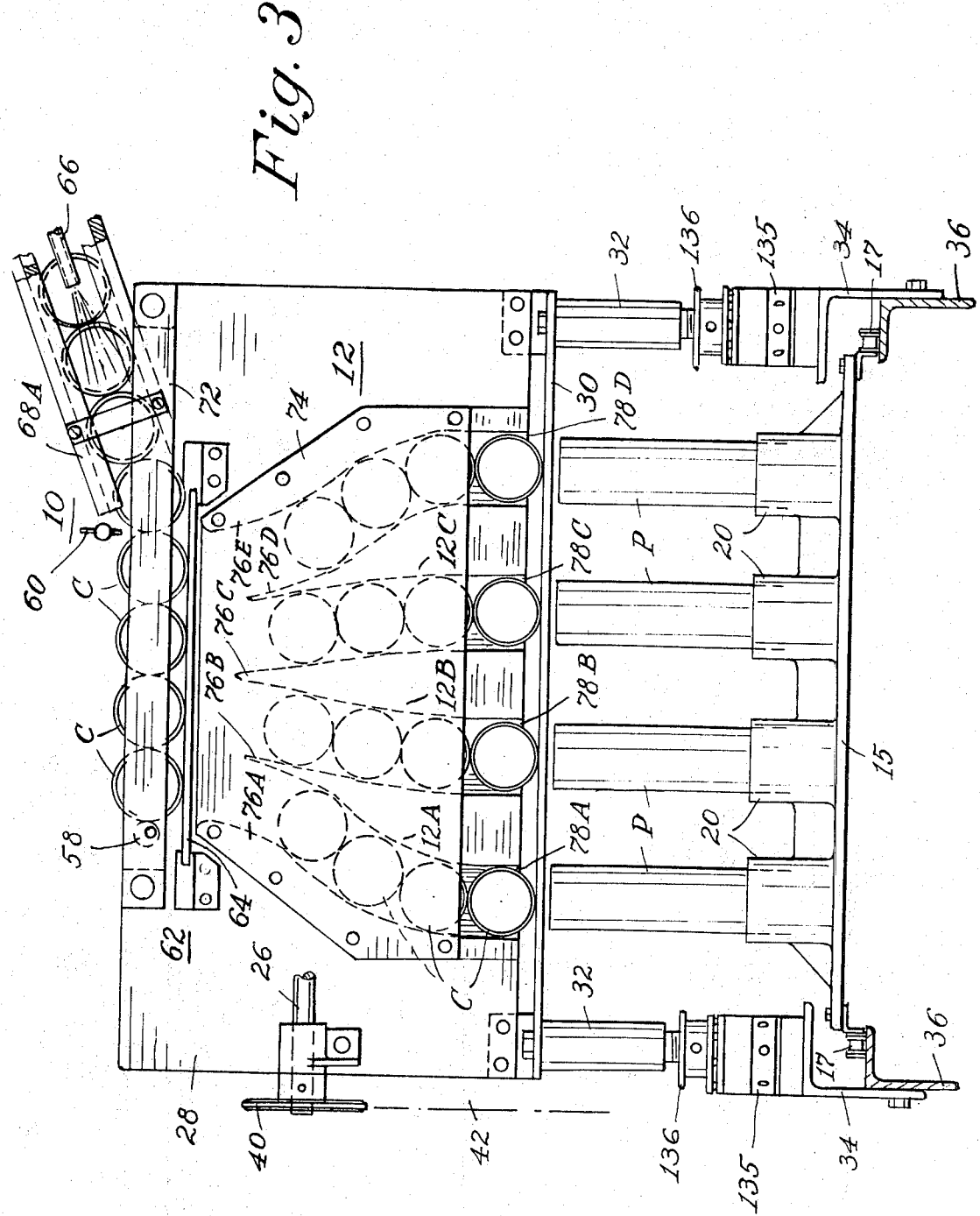

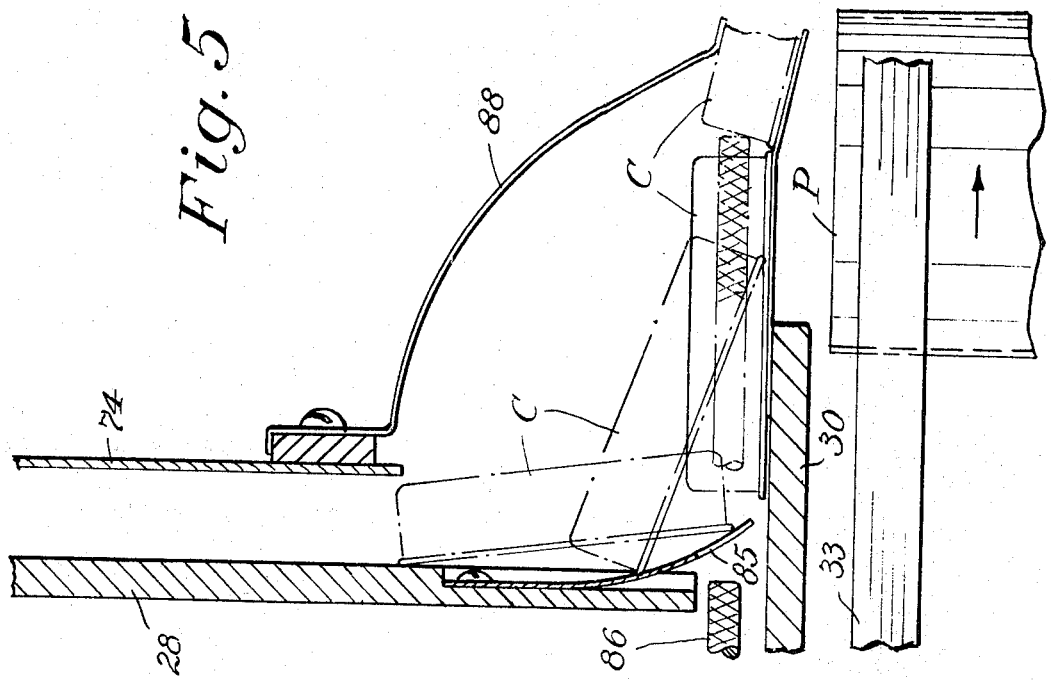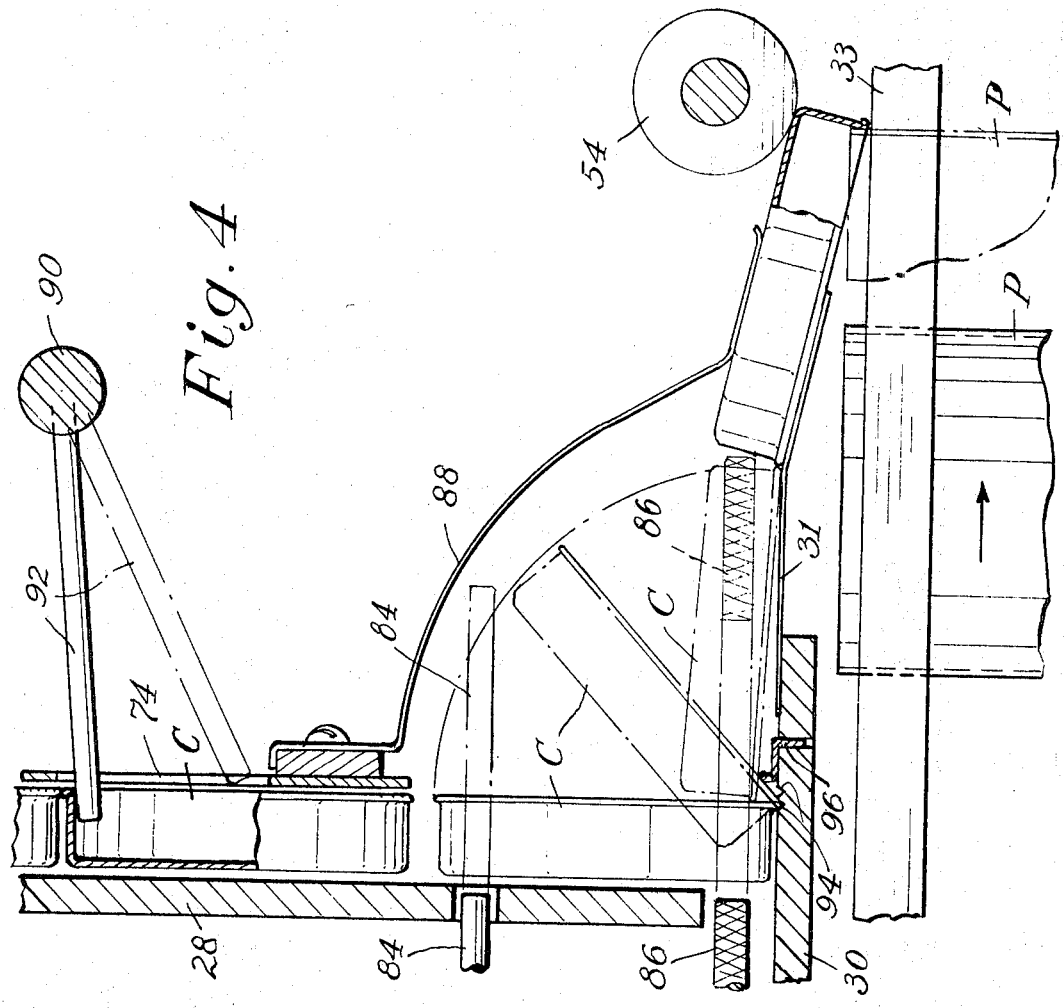

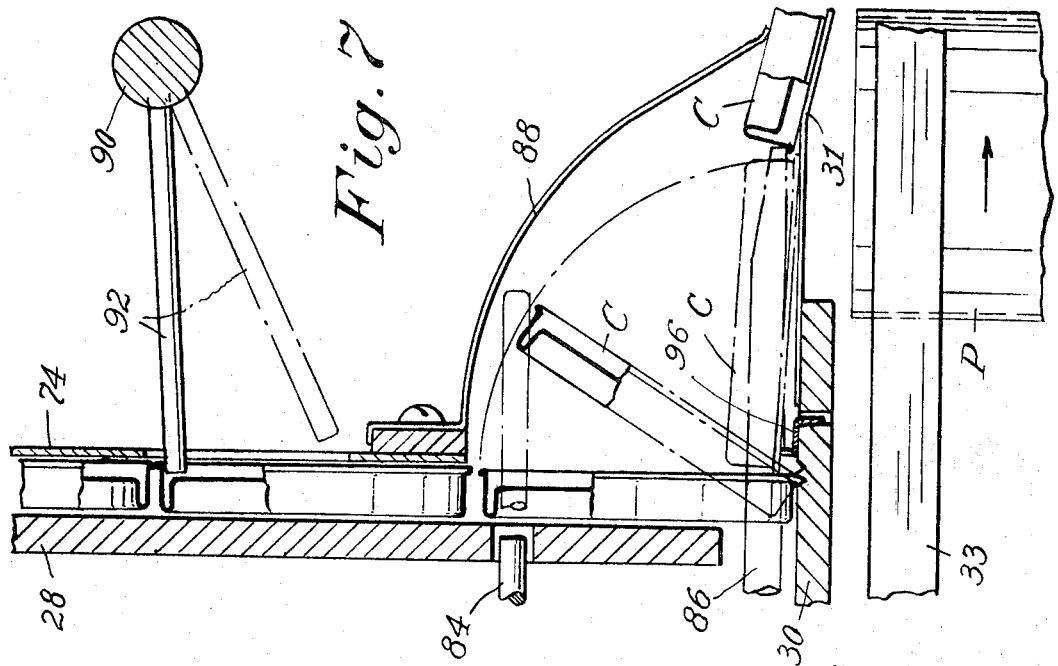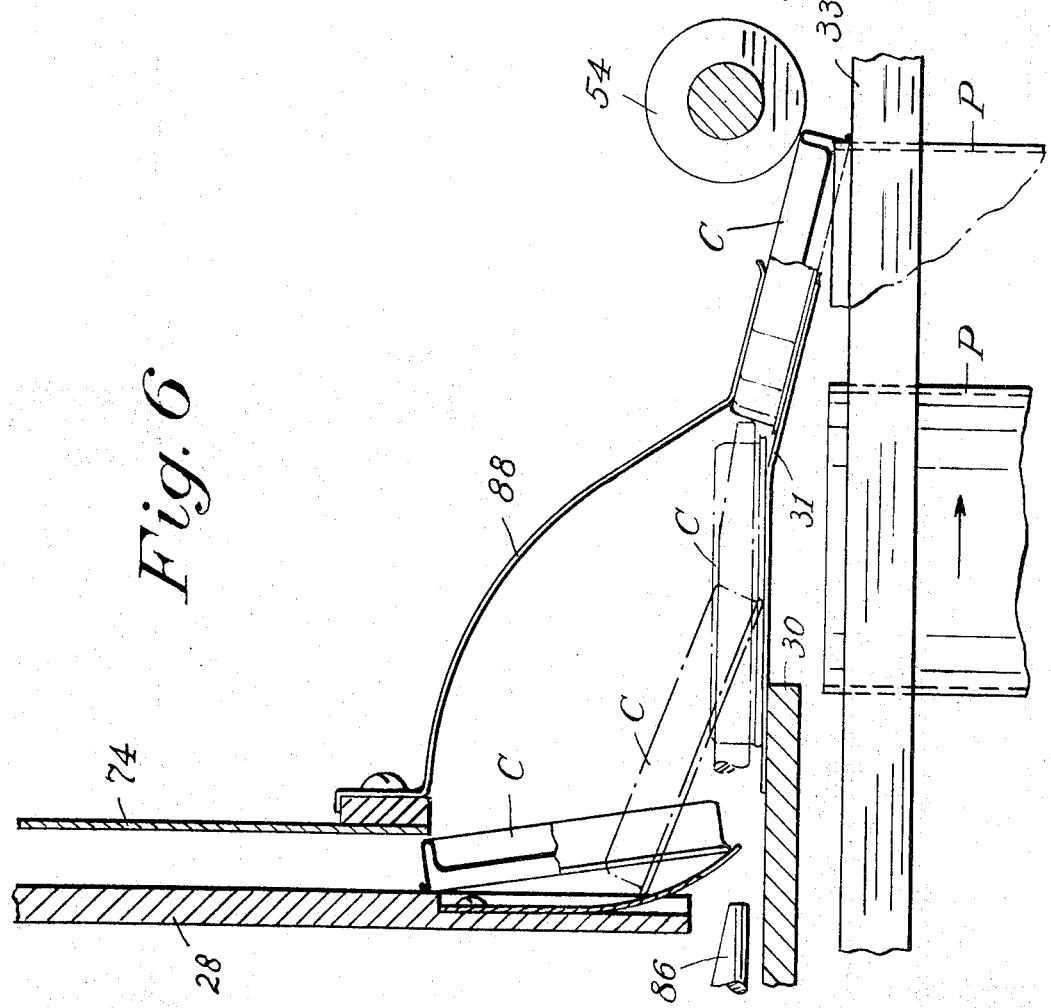

Oct. 13, 1970  L. H. LANGE  3,533,216
MECHANISM FOR FEEDING AND APPLYING CIRCULAR CAPS TO CONTAINERS
Filed Sept. 26, 1968  8 Sheets-Sheet 6
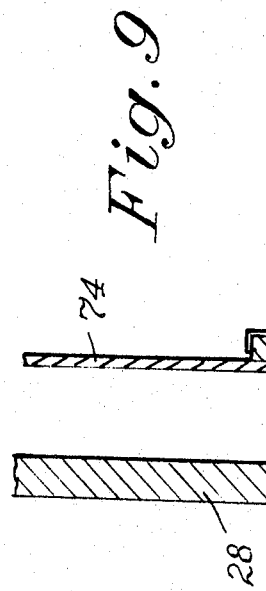
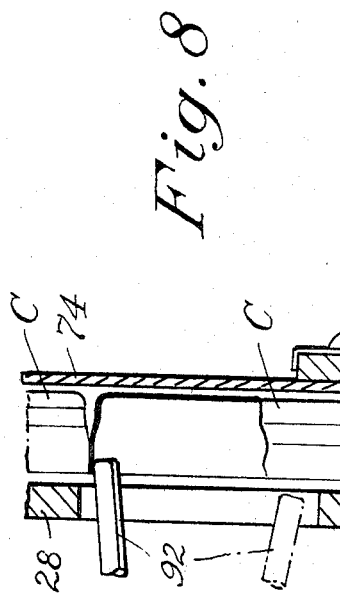

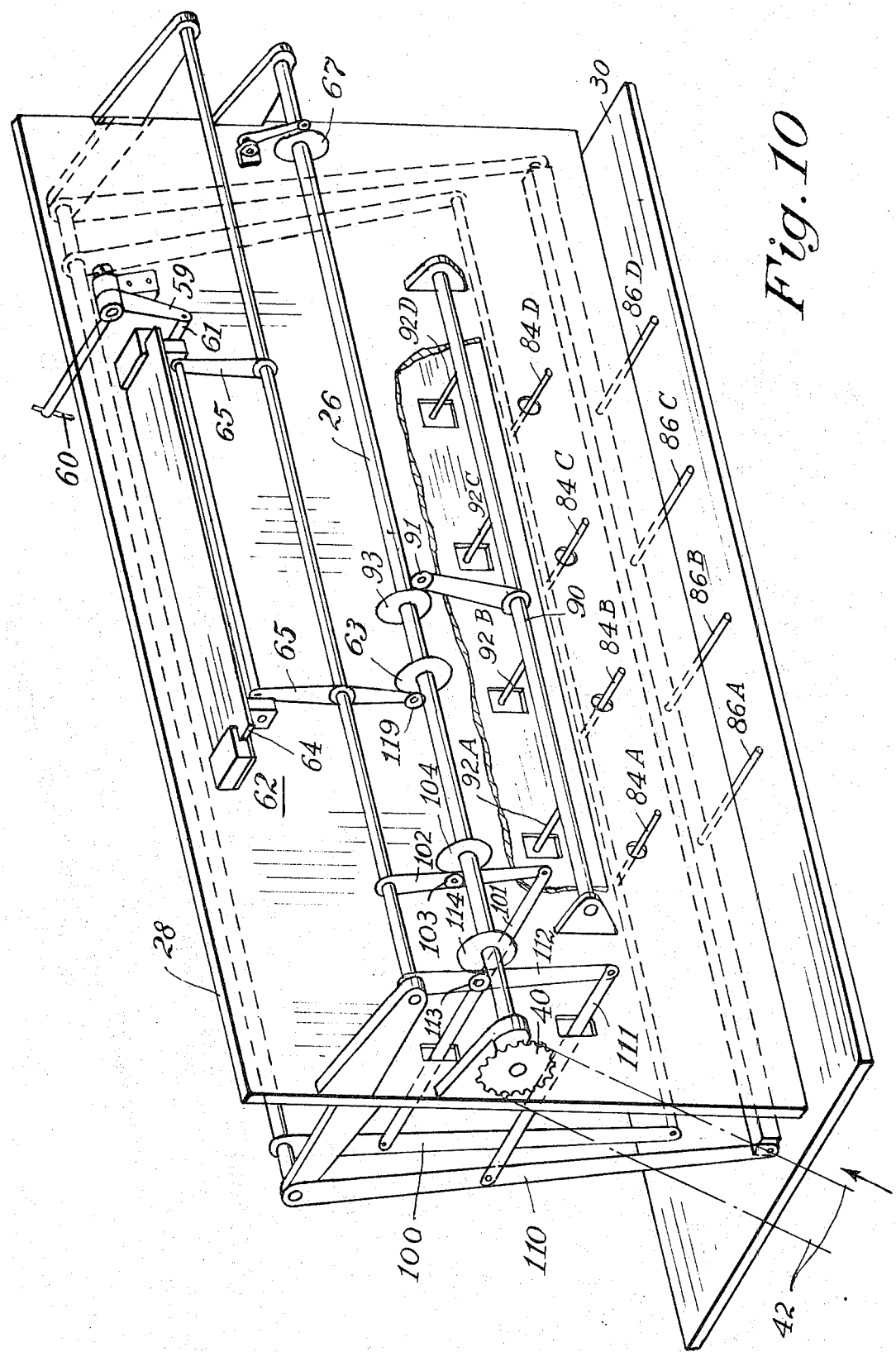

United States Patent Office 3,533,216
Patented Oct. 13, 1970

3,533,216
MECHANISM FOR FEEDING AND APPLYING
CIRCULAR CAPS TO CONTAINERS
Ludwig H. Lange, Rockledge, Pa., assignor to The Filler
Machine Company, Inc., Rockledge, Pa., a corporation of Pennsylvania
Filed Sept. 26, 1968, Ser. No. 762,908
Int. Cl. B65b 7/28
U.S. Cl. 53—314                                10 Claims

ABSTRACT OF THE DISCLOSURE

Arrangements for feeding and tipping circular, rigid caps of several types and in different orientations for application of the caps to containers en route from a filling station via a cap-applying station to a cap-pressing station. A multi-line capping station in which all unit-stations receive caps from a common supply. During feed of caps from the common supply to the unit-stations, all caps are maintained in vertical on-edge position for free-rolling or dropping in the same vertical plane and at the cap-applying station are deflected to substantially horizontal position.

BACKGROUND OF THE INVENTION

Prior machines known to me for feeding caps to the container line of an automatic filling machine have been unsatisfactory for various reasons including jamming of the caps.

SUMMARY OF THE INVENTION

In accordance with the present invention, a gate common to all vertical cap-fed chutes of a multi-line filling machine receives, per cycle of the machine, a group of caps in line and on edge as rolling from a common supply chute. When the gate is opened, the caps descend freely into the respective chutes for the different cap-applying stations without deviation from the vertical feed plane. At this time, further flow of caps from the common feed chute is precluded by a stop moved into the path of flow.

At the bottom of each chute, the cap is deflected from on-edge to a substantially horizontal position from which it is pushed. Depending upon the type and orientation of the cap, it is deflected to a horizontal position either by a reciprocable deflector element which tips it over for a free-fall about its lower edge as a pivot or by a short, curved deflection plate on which the lower edge freely slides as it reaches the bottom of the chute.

In some of the unit-station arrangements, again depending upon the type and orinetation of the caps, there is provided an oscillating cap-lifter element, which, during operation of the aforesaid cap-deflector element, is effective to prevent falling of the next uppermost cap or caps.

The invention further resides in features of construction, combination and arrangement herein disclosed and claimed.

For a more complete understanding of the invention, reference may be had to the accompanying drawings and to the description of preferred embodiments.

BRIEF DESCRIPTION OF THE DRAWINGS

FIG. 1 is a side elevational view of a container-filling and capping machine showing one capping-station arrangement embodying the invention;

FIG. 2 is a top plan view of the machine of FIG. 1 as used for a multi-line machine;

FIG. 3 is a front elevational view showing the cap-feeding and distributing arrangement for the multi-line machine of FIG. 2;

FIG. 4 is a side-elevational view on enlarged scale of cap-lifting, cap-tipping and cap-pushing means for the cap-applying station of FIG. 1;

FIG. 5 is a side-elevational view similar to FIG. 4 but showing a modified cap-applying station and its operation as used for the deep external caps of FIG. 4 in reverse orientation;

FIG. 6 illustrates the modified cap-applying station of FIG. 5 and its operation as used for shallow re-entrant-side, external caps having the same orientation as the type caps shown in FIG. 4;

FIG. 7 illustrates the cap-applying station of FIG. 4 and its operation as used for the type of caps shown in FIG. 6 but reversely oriented;

FIG. 8 illustrates a capping station similar to that of FIGS. 4 and 7 but with the cap-lifting means on the reverse side for internal caps oriented as shown;

FIG. 9 illustrates the capping-station of FIGS. 5 and 6 as used for the internal caps of FIG. 8 reversely oriented;

FIG. 10 schematically and in perspective illustrates a cam/linkage arrangement for operating the capping-station mechanisms shown in FIGS. 4 to 9.

DESCRIPTION OF PREFERRED EMBODIMENTS

Figure 12:
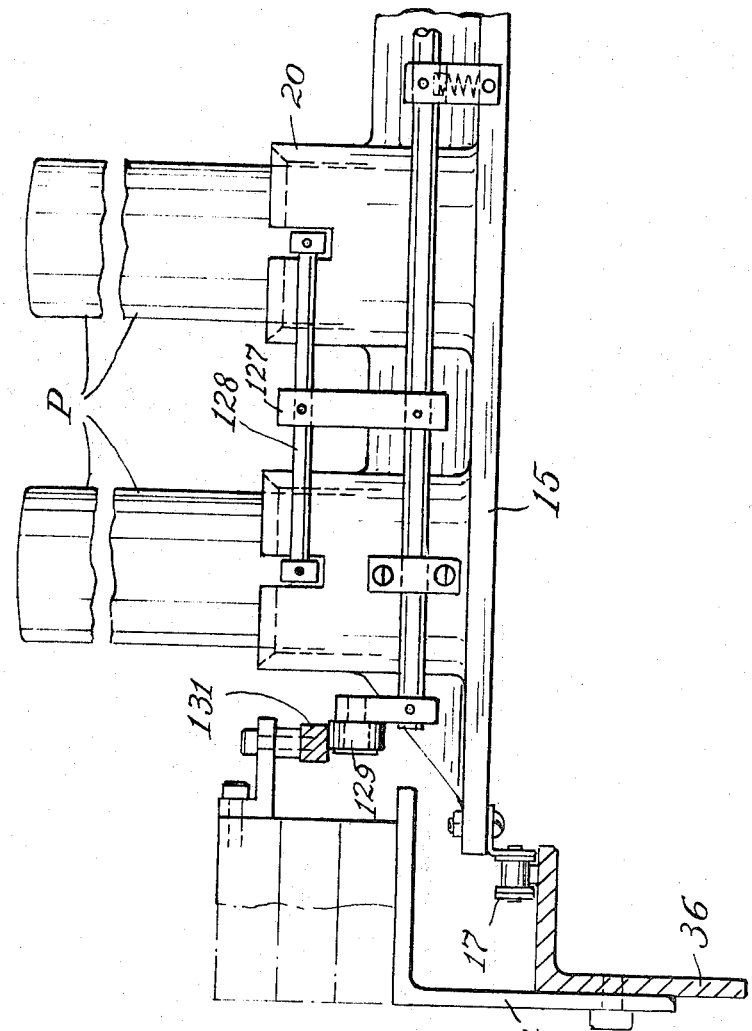
FIGS. 11 and 12 are end-elevational and side-elevational views respectively of a container-bracing arrangement.

In the container-filling machine 10 shown in FIGS. 1, 2 and 3, the containers P are advanced by endless conveyor 14 to pass through the filling-station 22, cap-applying station 12, and thence through cap-pressing station 56, Beyond the cap-pressing station, the capped containers are ejected from the conveyor by means not shown. In the particular four-line machine illustrated, each of the cross-bars 15 extending between the pair of conveyor chains 17 has four pockets or carriers 20 which receive empty containers P, open-end uppermost, at a loading station not shown. Usually, the containers P are cylindrical tubes of paper, or the like, and rather loosely fit into the pockets. At the discharge end of the machine 10, the chains 17 pass over drive sprockets 16 (FIG. 1) rotated step-by-step via a pawl and ratchet mechanism including the oscillating pawl 18 and ratchet 19.

While the conveyor 14 is at rest with one of the cross-bars 15 at the filling-station 22, the group of containers in its pockets 20 is filled with the desired material, such as semi-liquid, semi-solid or viscous products including grease, caulking compound and the like. A suitable conventional filling arrangement is briefly described. Each container P of the group is lifted from and returned to its pocket 20 by a multi-plunger arrangement not shown. During this operation, a charge of material is supplied to each container via a filling tube 23 (FIG. 1): a spring-biased sealing plate 23A assists in control of the container P. The containers P of each line are in succession filled and, in the next step of the conveyor 14, advanced toward a multi-line capping-station 12, now described in detail, and with which the invention is primarily concerned.

For non-jamming delivery of circular caps to the multi-line cap-applying stations 12A et seq. from a conventional unscrambler (not shown), there is provided a downwardly inclined track or chute 70 comprising a pair of horizontally spaced upper rails 68A, 68B and a grooved lower rail structure 68 having a bottom surface and horizontally-spaced side surfaces. The caps C in chute 70 form a continuous row of caps in substantially vertical on-edge position and free to roll down the chute 70 when permitted to do so by the movable stop 60 which is normally in the path of movement of caps from the chute. The gate means 62 at the discharge end of inclined chute 70 comprises a reciprocable plate 64 which for "closed-gate" position cooperates with side rails 72 to form a track section 70A in vertical alignment with and providing a continuation of the track section or chute 70. The eccentric 58 at the terminal end of track section 70A and above gate-place 64 provides an adjustable stop means. Movement of gate-plate 64 is effected by cam 63 via cam-follower 119 and arms 65 (FIG. 10).

The spaced front and back guide plates 28, 74 (FIGS. 1, 3) together with the intervening spacers 76A et seq. (FIG. 3) provide a series of guide means defining chutes 77A et seq. respectively extending downwardly to a stop plate 30. The back plate 74 terminates above the stop plate to leave a series of cap-discharge gaps 78A et seq., one per chute. These chutes on the outlet side of gate means 62 are in vertical alignment with the track sections 70, 70A on the inlet side of that gate means and are dimensioned for free dropping with slight clearance, of on-edge caps.

A series of pin or rod elements 84A et seq. reciprocable above bottom plate 30 are movable across the chutes 77A et seq. into the discharge gaps 78A et seq. respectively to provide means for tipping on-edge caps resting on the bottom plate 30 into substantially horizontal position on the extension 31 of the bottom plate. The deflector pins 84A et seq. are reciprocated per cycle of the machine 10 by mechanism including pivoted arms 100, link 101, pivoted arm 102, cam-follower 103 and cam 104 (FIG. 10).

A second series of pin or rod elements 86A et seq. reciprocable in a path just above bottom plate 30 (FIG. 1) are movable across the chutes 77A et seq. to push the tipped caps, open-side down, across the extension 31 of support plate 30 so that their forward edges extend into the path of the upper open ends of container P. Thus, the leading top-edge of each container P catches into each cap, and as it passes below roller 54 pulls the cap onto and over the open top of the container. The pusher rods 86A et seq. are reciprocated per cycle of the machine by mechanism including the pivoted arms 110, link 111, pivoted arm 112, cam-follower 113 and cam 114 (FIG. 10).

The timing cams 104 and 114 of the cap-deflector and cap-pusher means are on the shaft 26 continuously driven from one-time shaft 44 of the machine via the sprockets 38, 40 and chain 42. The chute stop 60 is oscillated in timed relation to gate-plate 64 by arm 59 and link 61.

When the gate 62 is temporarily opened during a cycle of the machine, a group of caps resting on gate-plate 64, and isolated from the row of caps in common supply chute 70A by the stop 60 is dropped and distributed by spacers 76A et seq. into the resepctive guide chutes 77A et seq. After the gate 62 is closed and before it is next re-opened, the stop 60 is lifted and caps roll out of inclined supply chute 70 onto the upper or inlet side of the now-closed gate-plate 64. When found necessary, the gravity feed of caps onto plate 64 may be supplemented by an air blast from pipe 66. For economy, the air blast may be timed by a control cam 67 (FIG. 10). There is no change in orientation of caps as they move down in chute 70 and along plate 64 until in-row on edge-flow or movement of caps is arrested by engagement of the leading cap with stop 58. The distance between adjustably-fixed stop 58 and the intermittently-operated stop 60 closely approximates the cap diameter times the number of container-lines so that with gate 62 closed, the descent of movable stop 60 segregates, from the supply row of caps, a group of in-row on-edge caps in which the number of caps corresponds with the number of containers to be filled in the next or subsequent cycle of the machine. The feed of caps from the time they enter the common supply chute until they reach the bottom plate of the applying station is in the same vertical plane and without change in orientation.

Specifically, in FIG. 4, for example, the caps as they arrive at the bottom plate 30 have their open-end facing away from the direction of container travel—i.e., the same orientation they had in common feed chute 70, on gate plate 64 and in the individual guide chutes 77A et seq. For caps of this type and orientation, the lowermost cap first rests on the pusher element 86 whose forward portion is knurled or roughened to reduced tendency for the falling cap to slide, open-side uppermost, onto plate 31. As the pusher element retracts to the full-line position shown in FIG. 4, the knurling restores the cap to erect position before it drops onto plate 30 with the beaded edge of its open-side received by a shallow groove 94 behind the small ridge 96.

While the cap is in this erect position, the deflector 84 operates to tip the cap over about the pivot provided by the groove so that the cap falls, open-face down, onto plate 30 with its skirt or side in the path of the retracted pusher 86. During the next forward stroke of the pusher, it slides the cap along support plate 31 and partially beyond the downwardly-inclined terminal portion. The free end of the curved leaf spring 88 extending from the rear guide plate 74 holds the cap in this overhanging position in the path of the upper open-end of the containers. Thus, the cap is picked up by the next container P, drawn from between plate 31 and spring 88 and pressed lightly onto the open-end of the container as it passes below roller 54 or equivalent.

The vertical alignment of the containers P of each line as they pass through this cap-applying zone is maintained by a pair of track-defining bars 33 below the support plate 30 and slidably engaging diametrically opposite sides of the container adjacent their upper ends. Cap-alignment at the point of application is provided for by a pair of bars 35 topside of the support plate 31 (FIG. 2).

In a subsequent cycle of the machine, a group of containers with caps so applied stops at the pressing station 56 (FIG. 1). The caps are there more firmly pressed onto the containers as by a set of plungers 57.

Reverting to FIG. 4, to prevent jamming when the lowermost cap of a vertical row is tipped over by deflector 84, the lifter 92 is timed to lift the next higher cap, as well as any above it, by swinging through an aperture in guide plate 74 to engage the upper inside wall of the cap. This occurs before deflector 84 moves forward from its retracted position. The lifter 92 swings in reverse direction to clear the guide chute and drop a cap on pusher element 86 before the latter returns to its retracted position. The oscillating movement of lifter 92, is derived from cam 93 and its follower 91 (FIG. 10), as supported from rock shaft 90.

When it is feasible to feed caps to machine 10 with the reverse cap-orientation shown in FIG. 5, i.e., with their open-ends facing the direction of container travel, the movable cap-deflecting elements may be omitted. In this modification, the pusher element 86 is in retracted position when a cap is dropped so that its tendency to slide and turn toward horizontal position is not inhibited. Further to enhance and take advantage of this tendency, each vertical guide chute is provided with a curved deflection plate 85 directing the caps into the discharge gap provided by the short rear plate 74 of the guide. The deflection plate 85 may be of light springy material apertured to permit forward movement of the cap-pushing element 86.

With this modification, it is also feasible to omit the movable cap-lifter elements 92 and so obtain higher momentum of a cap for faster turning movement from vertical to horizontal position when it reaches the bottom of the chute in a direct drop from the gate-plate 64 (FIG. 3).

Use of this simpler cap-applying arrangement is not limited to deep external caps such as shown in FIG. 5. For example, as shown in FIG. 6, it is also suited for applying shallow, re-entrant rim caps provided they can be supplied to common feed chute 70 with the orientation indicated: i.e., with their open side facing the direction of travel of the containers. When it is not feasible to supply such caps in this orientation, the first described arrangement (FIGS. 1–4) having movable deflector and cap-lifter elements 84, 92 is used. Their operation on this type of cap is clear from FIG. 7.

To adapt the basic cap-applying arrangement of FIGS. 1 to 4 for caps of the internal type, the machine is timed so that the containers come to rest, in position indicated in FIG. 8. A cap, as tipped with open-end uppermost, is pushed by element 86, progressively downwardly into the upper open end of a stationary container from the inclined rear portion of the cap-supporting plate 31. Any tendency for the cap, as dropped in the vertical chute, to slide into closed-end lowermost position is prevented by the small abutment 96. The dropped cap is tipped over from vertical to horizontal position, open-end uppermost position, by the reciprocable element 84. For this type of cap, vertically oriented as shown, the cap-lifter elements 92 swing through the front vertical guide-plate 28. Except for such difference, this arrangement is essentially the same as that of FIGS. 1 to 4 and 10.

When it is feasible to supply the internal type of caps to the machine in the reverse orientation, i.e., with the open-face back to the direction of container-travel, the simpler cap-applying arrangement shown in FIGS. 5 and 6 may be used.

and 6 may be used. The cap-tipping operation of this arrangement having no movable deflector elements 84 and no cap-lifting elements 92 is clear from FIG. 9 and by refernce, if necessary, to the description of FIGS. 5 and 6. The conveyor timing and operation of pusher element 86 to push a tipped-over cap of this type into the open end of a stationary container is the same as described in connection with FIG. 8.

Figure 11:
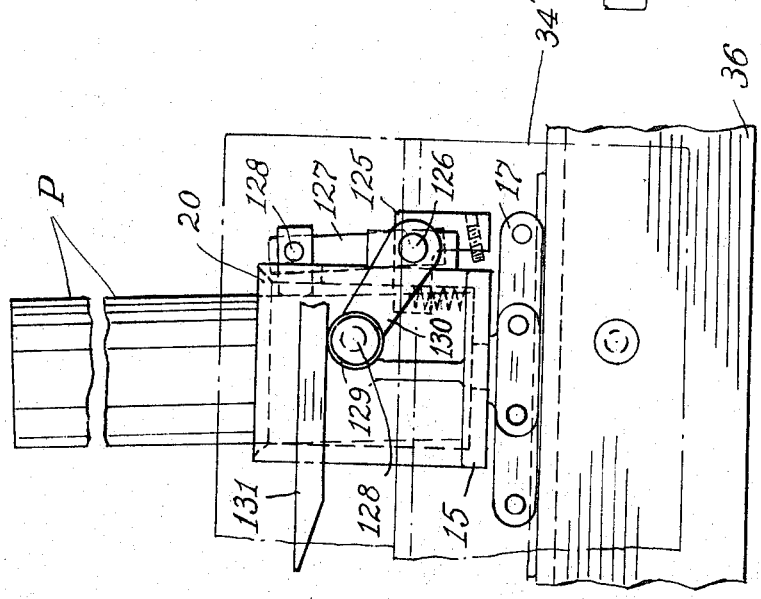

To insure the containers are in proper vertical position for application of caps at the capping-station 12, they are precluded from tilting sideways in the conveyor pockets by the guide bars 33, as previously described. To preclude a container from titlting backward when it draws an external cap from plate 31 (FIGS. 4 to 7), or from tilting forward when an internal cap is pushed (FIGS. 8, 9) into its open end, each cross-bar 15 may be provided (FIGS. 11–12) with bearings 125 for a shaft 126 to which, between each pair of pockets 20, is attached on arm 127. To each arm 127 is attached a cross-arm 128. This cross-arm is biased to position substantially away from engagement with the containers and does not obstruct loading of containers into the pockets, or movement of the containers at the filling and ejection stations. As a cross-bar 15 moves into the cap-applying station, the arm 127 is rocked in direction to bring its cross-arm 128 against the associated containers as an alignment stop. Specifically, in the arrangement shown in FIGS. 11 and 12, this occurs when cam-follower 129, on arm 130 attached to shaft 126, engages the stationary cam plate 131. Preferably, there are two such cam plates, one on each side of the machine. Each may be supported from a corresponding side frame 36 of the machine by way of the angle piece 34 which serves as a mount for the multi-cap-applying unit 12.

To accommodate the multi-line capping station 12 to containers of different height in different runs, for the mechanism of the station, the support 30 is attached to columns 32 (FIG. 1) which in turn are supported by angle piece 34 via the captive nuts 135 which engage the lower threaded extension of the column. Each pair of sprockets 136 on the corresponding nut sleeves is coupled by a chain 137 for simultaneous adjustment of the associated pair of columns 32.

What is claimed is:

1. For use with container-feeding means providing step-by-step feed of one or more lines of containers with their open ends uppermost, an arrangement comprising cap-applying stations respectively adjacent the path of movement of the open ends of the containers of a corresponding one of said lines thereof,
guide means respectively directed downwardly for gravity feed of caps in substantially vertical on-edge position toward corresponding cap-applying stations,
means associated with each guide for tipping successive caps to substantially horizontal position, and
means associated with each guide and operable per step of said container-feeding means to push a horizontally-positioned cap to a corresponding one of said cap-applying stations.

2. An arrangement as in claim 1 in which the cap-tipping means comprises reciprocable structure operable per step of said container-feeding means to engage the upper portion of a cap resting on its lower edge and tip it over about said lower edge.

3. An arrangement as in claim 1 additionally including cap-supporting means disposed to support an untipped cap in position for engagement of its upper portion by an element of said cap-tipping means and to support a tipped cap for engagement of its rim by an element of said cap-pushing means.

4. An arrangement as in claim 1
in which said cap-pushing means comprises a lower reciprocable member,
in which said cap-tipping means comprises an upper reciprocable member, and
which additionally includes cap-supporting means below said lower reciprocable member for support of the lower edge of a cap while the upper portion of said cap is in the path of said upper reciprocable member and for support of the tipped cap in position for pushing engagement by said lower reciprocable member.

5. An arrangement as in claim 4 in which said cap-supporting means has a groove for receiving an edge bead of the untipped cap and an abutment adjacent said groove in the direction of tipping of the cap.

6. An arrangement as in claim 1
in which said cap-tipping means includes a reciprocable element for engaging the upper portion of the lowermost untilted cap in said guide means, and
means intermittently operable to support the upper caps in said guide means during reciprocation of said element of the cap-tipping means.

7. An arrangement as in claim 1 in which said cap-tipping means is a curved extension of said guide means and terminates to discharge a tipped cap in the path of a reciprocating element of said cap-pushing means.

8. For use with container-feeding means providing step-by-step feed of two or more lines of containers having their open ends uppermost, an arrangement comprising
cap-applying stations respectively adjacent the path of movement of the open ends of the containers of a corresponding one of said lines thereof,
gate means above said container-feeding means,
track structure downwardly inclined toward the inlet side of said gate means for guiding a row of caps on edge,
guides from the outlet side of said gate means for directing on-edge caps toward a corresponding cap-applying station,
movable stop structure normally engaging the leading cap of said row and operable per step of said container-feeding means for release to said gate means of a group of on-edge caps in number cooresponding with the number of cap-applying stations, and
actuating means for said gate means operable per step of said container-feeding means to release an on-edge cap to each of said guides.

9. An arrangement as in claim 8 additionally including
means associated with each guide for tipping caps in succession from a substantially vertical to a substantially horizontal position, and means associated with each guide and operable per step of said container-feeding means to push a horizontally-position cap to the corresponding one of said cap-applying stations.

10. An arrangement as in claim 8 additionally including means for directing an air blast against caps while in said inclined track structure to supplement their feed by gravity.

References Cited

UNITED STATES PATENTS

| | | | |
|---|---|---|---|
| 1,955,704 | 4/1934 | Bahelka | 53—313 X |
| 3,342,372 | 9/1967 | Whitchurch | 53—313 X |

TRAVIS S. McGEHEE, Primary Examiner

U.S. Cl. X.R.

53—202, 319; 221—238